(12) United States Patent
Talty et al.

(10) Patent No.: US 8,175,770 B2
(45) Date of Patent: May 8, 2012

(54) HEIGHT SENSING SYSTEM FOR A VEHICULAR SUSPENSION ASSEMBLY

(75) Inventors: Timothy J. Talty, Beverly Hills, MI (US); Chandra S. Namuduri, Troy, MI (US); Yunjun Li, West Bloomfield, MI (US); Robert B. Elliott, Waterford, MI (US); Nancy McMahon, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 592 days.

(21) Appl. No.: 12/272,074

(22) Filed: Nov. 17, 2008

(65) Prior Publication Data

US 2010/0125389 A1    May 20, 2010

(51) Int. Cl.
*B60G 17/018* (2006.01)
(52) U.S. Cl. ......................................................... 701/37
(58) Field of Classification Search ................ 701/1, 36, 701/37, 38
See application file for complete search history.

(56) References Cited

U.S. PATENT DOCUMENTS

| | | | |
|---|---|---|---|
| 2,594,755 A | | 4/1952 | Felt |
| 4,297,609 A | | 10/1981 | Hirao et al. |
| 4,600,215 A | * | 7/1986 | Kuroki et al. ............... 280/5.519 |
| 4,757,315 A | | 7/1988 | Lichtenberg et al. |
| 4,817,922 A | | 4/1989 | Hovance |
| 4,822,063 A | | 4/1989 | Yopp et al. |
| 4,827,416 A | * | 5/1989 | Kawagoe et al. ............... 701/38 |
| 4,836,578 A | | 6/1989 | Soltis |
| 5,009,450 A | | 4/1991 | Herberg et al. |
| 5,056,913 A | * | 10/1991 | Tanaka et al. ................. 356/4.06 |
| 5,103,396 A | * | 4/1992 | Hiwatashi et al. ............... 701/38 |
| 5,127,667 A | * | 7/1992 | Okuda et al. ............... 280/5.513 |
| 5,218,308 A | | 6/1993 | Posebeck et al. |
| 5,251,729 A | | 10/1993 | Nehl et al. |
| 5,267,466 A | | 12/1993 | Morris |
| 5,347,186 A | | 9/1994 | Konotchick |
| 5,373,445 A | | 12/1994 | Yopp |
| 5,390,949 A | | 2/1995 | Naganathan et al. |
| 5,450,322 A | * | 9/1995 | Tanaka et al. .................... 701/37 |
| 5,461,564 A | | 10/1995 | Collins et al. |
| 5,638,927 A | | 6/1997 | Cheatham et al. |

(Continued)

FOREIGN PATENT DOCUMENTS

DE    39 09 190 C1    8/1990

(Continued)

OTHER PUBLICATIONS

Namuduri, Chandra S. et al. "Notice of Allowance" mailed Jan. 4, 2011; U.S. Appl. No. 12/394,438, filed Feb. 27, 2009.

(Continued)

*Primary Examiner* — James Trammell
*Assistant Examiner* — Truc M Do
(74) *Attorney, Agent, or Firm* — Ingrassia Fisher & Lorenz, P.C.

(57) ABSTRACT

A system is provided for determining a distance between a vehicular suspension assembly and the ground, wherein the suspension assembly has a first member. The system comprises a first transceiver coupled to the first member for emitting a first interrogation signal toward the ground, and for receiving a first reflection of the first interrogation signal from the ground, and a processor coupled to the first transceiver for determining the distance of the first transceiver from the ground.

14 Claims, 4 Drawing Sheets

U.S. PATENT DOCUMENTS

| | | | |
|---|---|---|---|
| 5,944,763 A * | 8/1999 | Iwasaki | 701/37 |
| 5,990,441 A | 11/1999 | Zaenglein et al. | |
| 6,069,581 A | 5/2000 | Bell et al. | |
| 6,209,691 B1 | 4/2001 | Fehring et al. | |
| 6,234,654 B1 * | 5/2001 | Okuchi et al. | 362/466 |
| 6,427,812 B2 | 8/2002 | Crawley et al. | |
| 6,502,837 B1 * | 1/2003 | Hamilton et al. | 280/5.515 |
| 6,614,239 B2 * | 9/2003 | Borghi | 324/644 |
| 6,866,127 B2 * | 3/2005 | Nehl et al. | 188/266.1 |
| 7,123,351 B1 * | 10/2006 | Schaefer | 356/4.07 |
| 7,221,437 B1 * | 5/2007 | Schaefer | 356/4.07 |
| 7,250,697 B2 | 7/2007 | Beaulieu | |
| 7,380,800 B2 * | 6/2008 | Klees | 280/5.519 |
| 7,420,462 B2 | 9/2008 | Nordmeyer | |
| 7,733,239 B2 | 6/2010 | Nordmeyer | |
| 7,777,396 B2 | 8/2010 | Rastegar et al. | |
| 7,948,613 B2 * | 5/2011 | Fourcault et al. | 356/28 |
| 2002/0032508 A1 * | 3/2002 | Uchino et al. | 701/37 |
| 2003/0034697 A1 | 2/2003 | Goldner et al. | |
| 2005/0077692 A1 * | 4/2005 | Ogawa | 280/5.517 |
| 2005/0090956 A1 * | 4/2005 | Ogawa | 701/37 |
| 2005/0270221 A1 * | 12/2005 | Fedotov et al. | 342/28 |
| 2006/0186586 A1 | 8/2006 | Soles et al. | |
| 2006/0188120 A1 | 8/2006 | Fisher | |
| 2006/0271678 A1 | 11/2006 | Jessup et al. | |
| 2007/0032913 A1 * | 2/2007 | Ghoneim et al. | 701/1 |
| 2007/0129865 A1 * | 6/2007 | Kim | 701/37 |
| 2007/0205881 A1 | 9/2007 | Breed | |
| 2007/0251776 A1 | 11/2007 | Braun | |
| 2008/0116849 A1 | 5/2008 | Johnston | |
| 2008/0252174 A1 | 10/2008 | Mohammadi et al. | |
| 2008/0284258 A1 | 11/2008 | Spratte et al. | |
| 2009/0021720 A1 | 1/2009 | Hecker | |
| 2009/0045698 A1 | 2/2009 | Genis et al. | |
| 2009/0278927 A1 * | 11/2009 | Ishiyama et al. | 348/139 |
| 2010/0052475 A1 | 3/2010 | Lee | |
| 2010/0094503 A1 | 4/2010 | Li et al. | |
| 2010/0123568 A1 | 5/2010 | Namuduri et al. | |
| 2010/0219641 A1 | 9/2010 | Namuduri et al. | |
| 2010/0219720 A1 | 9/2010 | Namuduri et al. | |
| 2010/0219721 A1 | 9/2010 | Namuduri et al. | |
| 2010/0219798 A1 | 9/2010 | Namuduri et al. | |
| 2010/0225527 A1 | 9/2010 | Talty et al. | |

FOREIGN PATENT DOCUMENTS

| | | |
|---|---|---|
| DE | 41 12 276 C2 | 11/1992 |
| DE | 295 18 322 U1 | 1/1996 |
| DE | 103 58 764 A1 | 7/2005 |
| DE | 10 2004 010 229 A1 | 9/2005 |
| DE | 10 2005 008 403 A1 | 9/2006 |
| FR | 2594755 A3 | 8/1987 |
| GB | 2 098 007 A | 11/1982 |
| JP | 60101425 A | 6/1985 |
| JP | 4359901 B1 | 11/2009 |

OTHER PUBLICATIONS

Chinese Office Action for Chinese Application No. 200910206391.1 mailed Jan. 19, 2011.

U.S. Office Action for U.S. Appl. No. 12/271,551 mailed Feb. 10, 2011.

German Office Action for German Application No. 10 2009 047 855.8-21 mailed Jan. 21, 2011.

German Office Action for German Application No. 10 2009 052 717.6-21 mailed Feb. 16, 2011.

German Office Action for German Application No. 10 2010 008 318.6 mailed May 11, 2011.

U.S. Office Action for U.S. Appl. No. 12/394,328 mailed Jun. 10, 2011.

Notice of Allowance mailed Nov. 18, 2010, issued in U.S. Appl. No. 12/394,438.

Notice of Allowance mailed Oct. 8, 2010, issued in U.S. Appl. No. 12/400,112.

Sang-Dong, K., et al., "Performance Analysis of UWB Radar for Vehicle in Multi-User Environments," 10th International Conference on Advanced Communication Technology, ICACT. Feb. 17-20, 2008, pp. 1036-1039, vol. 2.

Samkov, S.V., "Signal Processing in UWB Radars of Small Distance," 2004 Second International Workshop on Ultrawideband and Ultrashort Impulse Signals. Sep. 19-22, 2004, pp. 208-210.

Optek Technology, Inc. "OPTEK's Autopad Contactless Sensor Delivers Absolute Position, Angle and Linear Displacement Sensing." [Retrieved on Aug. 11, 2008]. Retrieved from Internet: <URL: http://license.icopyright.net/user/viewFreeUse.act?fuid=MTM4Mjg4MQ%3D%3D>.

Li, Y., et al. "Self-Powered Vehicle Sensor Systems," U.S. Appl. No. 12/900,707.

Notice of Allowance, dated Jan. 5, 2012, for U.S. Appl. No. 12/271,551.

Notice of Allowance, dated Nov. 16, 2011, for U.S. Appl. No. 12/394,326.

Notice of Allowance, dated Dec. 12, 2011, for U.S. Appl. No. 12/252,114.

* cited by examiner

HEIGHT SENSING SYSTEM FOR A VEHICULAR SUSPENSION ASSEMBLY

TECHNICAL FIELD

The present invention generally relates to vehicular suspension assemblies, and more particularly relates to a height sensing system integrated into a vehicular suspension assembly.

BACKGROUND OF THE INVENTION

Control systems that automatically regulate ride height and suspension damping have been integrated into the suspensions of many vehicles. These systems rely on height sensors to provide real-time feedback on the distance between selected suspension components, or relative height, of sprung and unsprung vehicle masses. This data may be relayed to controllers that respond to relative height variations by adjusting compensating elements in the suspension to provide greater chassis stability. Accuracy in relative height measurement enables a more precise system response and thereby enhances vehicle performance characteristics including ride comfort and handling especially during cornering, accelerating, and braking.

Typical relative height sensors use mechanical linkages connected between monitoring points in the suspension that convert linear displacement to an angular motion. A contacting or non-contacting, electro-mechanical sensor converts this angular displacement to an electrical signal indicative of the height differential. However, such systems often include mounting arms, sensor links and brackets, and a myriad of associated connecting fasteners and therefore increase part count and complicate assembly and servicing. Further, the exposure of these systems to the undercarriage of a vehicle increases their vulnerability to contamination and road debris that can cause damage and/or degrade long term performance and reliability. In addition, current systems do not determine the absolute height of a vehicle, that is, the distance between selected chassis components and the ground.

Accordingly, it is desirable to provide a height sensing system for use in conjunction with a vehicular suspension assembly that determines the distance between selected suspension monitoring points and the ground. Further, it is also desirable if such a system is simpler to assemble, more convenient to service, and has a reduced part count. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In accordance with an embodiment, by way of example only, a system is provided for determining a distance between a vehicular suspension assembly and the ground, wherein the suspension assembly has a first member. The system comprises a first transceiver coupled to the first member for emitting a first interrogation signal toward the ground, and for receiving a first reflection of the first interrogation signal from the ground, and a processor coupled to the first transceiver for determining the distance of the first transceiver from the ground.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The various embodiments of the present invention described herein provide an electronic height sensing system for a vehicular suspension. The system includes one or more transceivers each coupled to a component of a vehicular suspension assembly for monitoring the height thereof. Each transceiver is configured to sense the "absolute" height, or the vertical distance between the transceiver and the ground. When the system is configured with two or more transceivers, the "relative" height, or the difference in vertical distance between any two transceivers may also be determined. As used herein, the absolute height of a transceiver, or the relative height between transceivers is not distinguished from the absolute or relative heights, respectively, of the suspension component that such transceivers are coupled to.

Relative height can be especially useful when referring to the distance between sprung and unsprung vehicle masses because of the important role this quantity plays in ride height and chassis control. Transceivers coupled to suspension components send electronic signals in the form of, for example, timing pulses or digitized data, indicative of absolute height to a coupled processor configured to use these signals in determining the actual height of the component. Such height data may then be relayed to a controller for use in adjusting controlled suspension elements to maintain the stability of a vehicle chassis and body for a variety of road surface conditions. In addition, height data may be used to determine the vertical component of absolute and/or relative velocity and acceleration of and/or between suspension components. This information may also be used by a chassis controller to further refine steering, cornering, accelerating, and braking performance.

Figure 1:
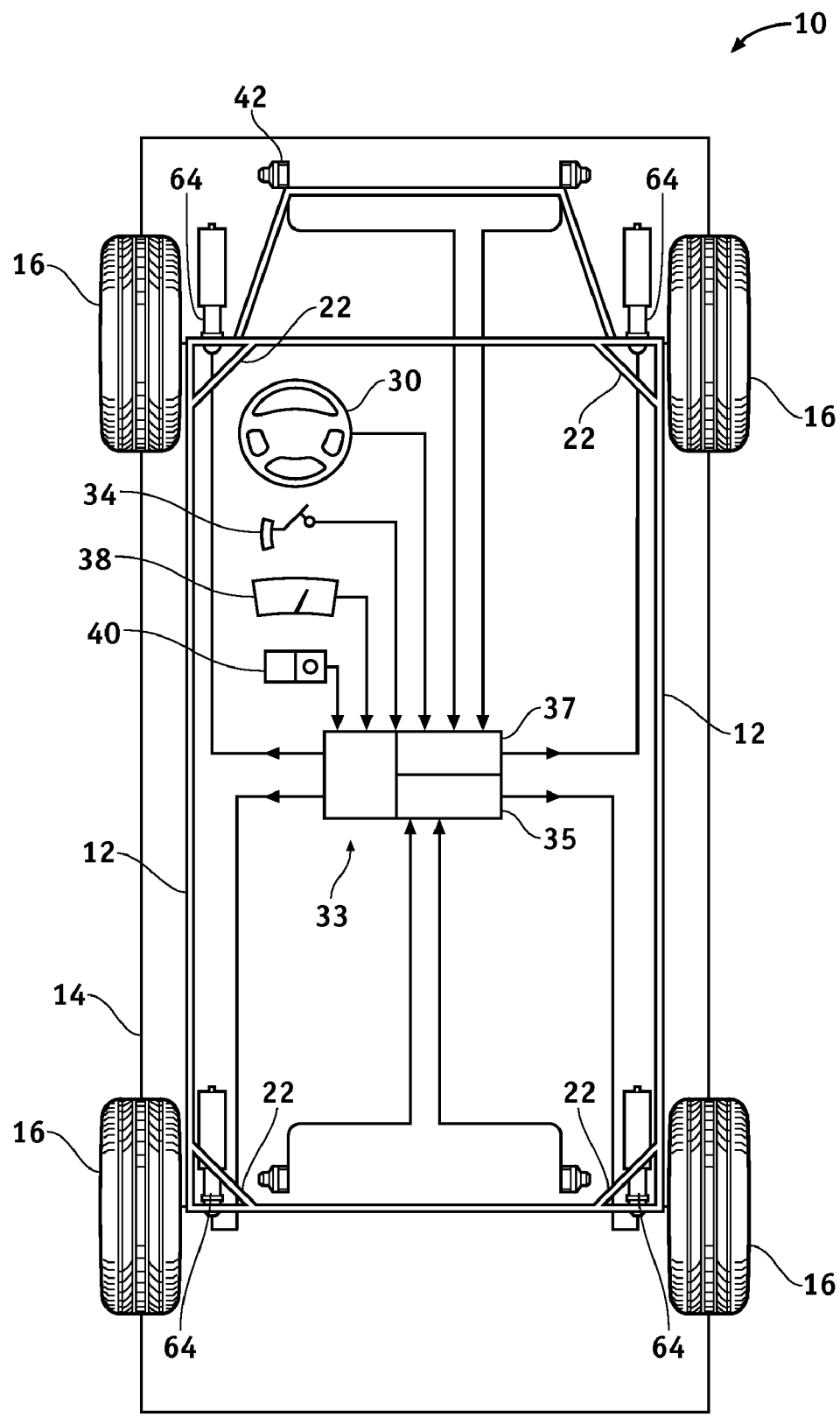
FIG. 1 is a schematic view of an exemplary vehicle illustrating the manner in which an embodiment is integrated with various sub-components of the vehicle.

FIG. 1 is a plan view of a vehicle 10 (e.g., an automobile) for use in conjunction with one or more embodiments of the present invention. Vehicle 10 includes a chassis 12, a body 14, four wheels 16, a suspension assembly 22, and a chassis control module (or CCM) 33. Body 14 is arranged on the chassis 12 and substantially encloses the other components of the vehicle 10. Body 14 and chassis 12 may jointly form a frame. The wheels 16 are each rotationally coupled to chassis 12 near a respective corner of body 14. Suspension assembly 22 is configured to provide a damped and stabilized coupling between a sprung vehicle mass including body 14, and an unsprung mass including wheels 16 and part of chassis 12. Suspension assembly 22 may include springs, linear actuators, control arms or links, and other interconnecting and supporting members, and further includes at least one damper assembly 64 such as a shock absorber or a strut, or the like, for providing damped motion between sprung and unsprung vehicle masses. Damper assemblies 64 may be configured to respond passively to vehicle motion, or as shown in FIG. 1, may be coupled to CCM 33 and configured to provide controlled suspension adjustments as directed thereby. As shown, vehicle 10 has four such damper assemblies 64, each mechanically coupled to suspension assembly 22 proximate wheels 16, and coupled in communication with CCM 33.

Vehicle 10 may be any of a variety of vehicle types, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). Vehicle 10 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, or a fuel cell, a combustion/electric motor hybrid engine, and an electric motor.

Still referring to FIG. 1, chassis control module 33 is coupled in communication with various automotive sub-system sensors including a steering sensor 30 for determining steering direction, at least one lift/dive sensor 34 used to monitor chassis response to braking and accelerating, and a speed sensor 38 for measuring vehicle speed. CCM 33 also includes a user interface 40 whereby a driver may enter various system commands and receive therefrom other pertinent system information. CCM 33 is also coupled in communication with various transceivers used as vehicle height sensors mechanically coupled to body 14, chassis 12, and/or suspension assembly 22 for monitoring vehicle height including at least a first transceiver 42. CCM 33 also includes at least a processor 37 for processing vehicle height information received from vehicle height sensors, and a controller 35 coupled to processor 37 for relaying electronic commands to controlled suspension components including, for example, damper assemblies 64 in response to processor prompts. During operation, vehicle height sensors monitor the distance between the ground and selected suspension, body, and/or chassis components, and transfer signals indicative of this distance to processor 37. Processor 37 then converts these signals to data that may be used by controller 35 to make appropriate compensating chassis adjustments.

Figure 2:
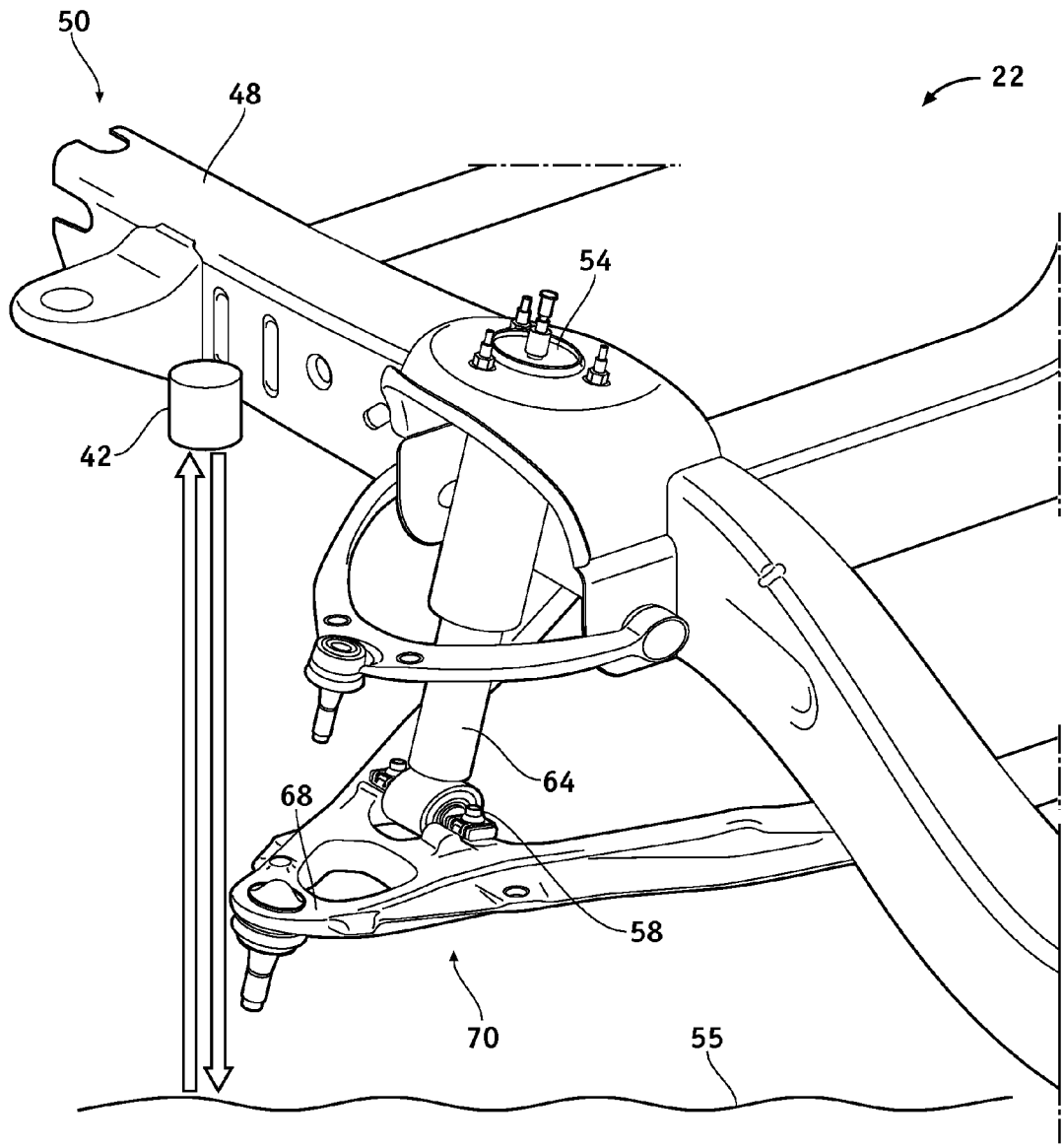
FIG. 2 is an isometric view of a vehicular suspension assembly for use with the vehicle depicted in FIG. 1 in accordance with an exemplary embodiment.

FIG. 2 illustrates first transceiver 42 integrated into suspension assembly 22 of vehicle 10 (FIG. 1) in accordance with an exemplary embodiment. Suspension assembly 22 includes damper assembly 64 coupled between a sprung vehicle mass 50 and an unsprung vehicle mass 70, and configured to dampen vertical motion therebetween in a well known manner. Damper assembly 64 has a first end coupled to a lower control arm 68 of unsprung mass 70 by a lower mount 58, and a second end coupled to a frame structural member 48 of sprung mass 50 by an upper mount 54. Mounting of damper assembly 64 to structural members and control arms may be done in any conventional manner using mounting brackets and fasteners. First transceiver 42 is an element of CCM 33 and is coupled in two-way communication with processor 37 (FIG. 1). First transceiver 42 may be mechanically coupled to any suitable component of suspension assembly 22 wherein it is desirable to monitor the component-to-ground height such as, for example, structural member 48. During operation, first transceiver 42 emits interrogation signals toward the ground 55 when prompted by processor 37, and detects the reflection of these interrogation signals returned from the ground 55. Processor 37 records the time of prompting, and first transceiver 42 sends an electronic timing signal to processor 37 when the interrogation signals are detected.

The interrogation signals emitted by first transceiver 42 may be electromagnetic in nature and may include but are not limited to ultra wide band (UWB) radar, infrared (IR), or laser light radiation, or alternatively may comprise an ultrasonic sound wave. Processor 37 combines the time recorded when first transceiver 42 was prompted with a timing signal returned by first transceiver 42 indicative of the timing of interrogation signal detection to determine the total elapsed time between emission and detection. Processor 37 converts the elapsed times to an absolute distance from the component to the ground, $D_1$, using for example, an algorithm that may include Equation (1) below:

$$D_1 = 0.5c \times [\Delta t_1] \tag{1}$$

where c is the speed of propagation of the transmitted and reflected interrogation signals, and $\Delta t_1$ represents the time lapse between interrogation signal emission and detection by first transceiver 42 of the reflection of the interrogation signal. The final result may be modified to account for systemic errors such as time delays in timing signal transfer and the like.

First transceiver 42 is configured to emit and detect interrogation signals of a specific type or types, and comprises one of a variety of transmission/detection systems based upon either electromagnetic radiation or sound waves. In one embodiment, first transceiver 42 comprises a transmitter component configured to emit short duration UWB or radar pulses that may include wavelengths in the radio and/or microwave frequency ranges. One example of such a commercially available UWB transceiver is manufactured by Freescale Semiconductor bearing part number XS 100. The detection component of first transceiver 42 in this embodiment may be based upon RFCMOS (radio frequency, complementary metal oxide semiconductor) technology tuned for compatibility with the transmitter.

In another embodiment, first transceiver 42 is configured with semiconductor-based laser diodes that emit/detect radiation over a narrow range of wavelengths. The detection component for this transceiver may also be a semiconductor diode configured to detect light at the transmitted wavelength(s). In a further embodiment, first transceiver 42 is configured to emit IR radiation and preferably comprises a semiconductor light emitting diode (LED). This type of transceiver may also comprise a photodiode detector such as a PIN-type photodiode tuned to detect light of the emitted wavelengths. In yet a further embodiment, first transceiver 42 comprises an ultrasonic transducer configured to emit ultrasonic pressure waves. A transceiver of this type also includes a second pressure transducer tuned to detect these sound waves.

To aid in source recognition and mitigate the effects of stray radiation, each of the transceiver embodiments described above preferably emits a pulsed interrogation signal comprising short duration, electromagnetic or sound emissions. Interrogation signal pulse duration and/or cadence may be optimized to be compatible with an absolute height range characteristic of a vehicle suspension system. Further, when multiple transceivers are used in a suspension assembly as described further in following embodiments, interrogation signals may be varied between each transceiver to encode the signal and avoid confusion as to the correct source and mitigate the effects of stray light or other types of false signals. In another embodiment, first transceiver 42 may be equipped with a duplexer to aid in switching between transmission and detection at an appropriate predetermined rate.

Figure 3:
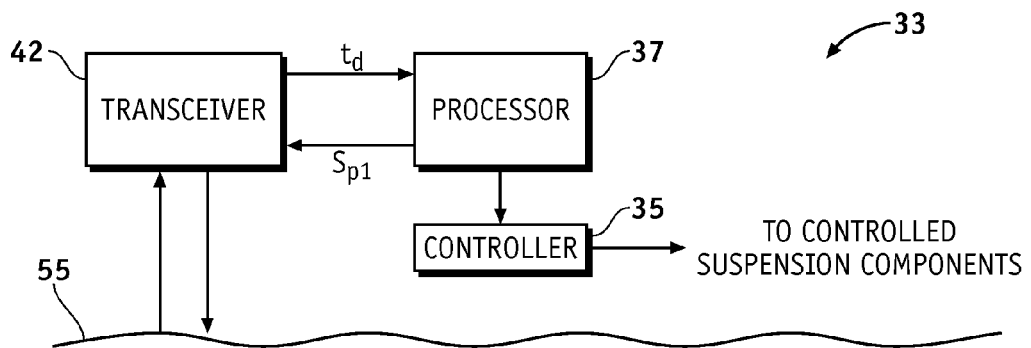
FIG. 3 is a block diagram of the exemplary height sensor system illustrated in FIG. 2.

FIG. 3 is a block diagram of selected components of CCM 33 from vehicle 10 (FIG. 1) including first transceiver 42, processor 37, and controller 35 in accordance with an exemplary embodiment. Processor 37 is operatively coupled to controller 35, and is coupled in two-way communication with first transceiver 42. First transceiver 42 is configured to emit electromagnetic or ultrasonic interrogation signals toward the ground 55 when prompted by a signal, $S_{p1}$, from processor 37, and to detect the reflection of these interrogation signals reflected from the ground 55. Processor 37 then records the timing of this prompt and receives an electronic timing signal indicative of the timing of detection ($t_d$) from first transceiver 42. Processor 37 uses the difference between the times of prompting and detection in conjunction with an appropriate equation/algorithm previously described to determine the distance of first transceiver 42 from the ground. Controller 35 receives the height data as an input signal from processor 37, and may dispatch real-time commands to controlled suspension elements in response to current chassis conditions as reflected by this data.

Figure 4:
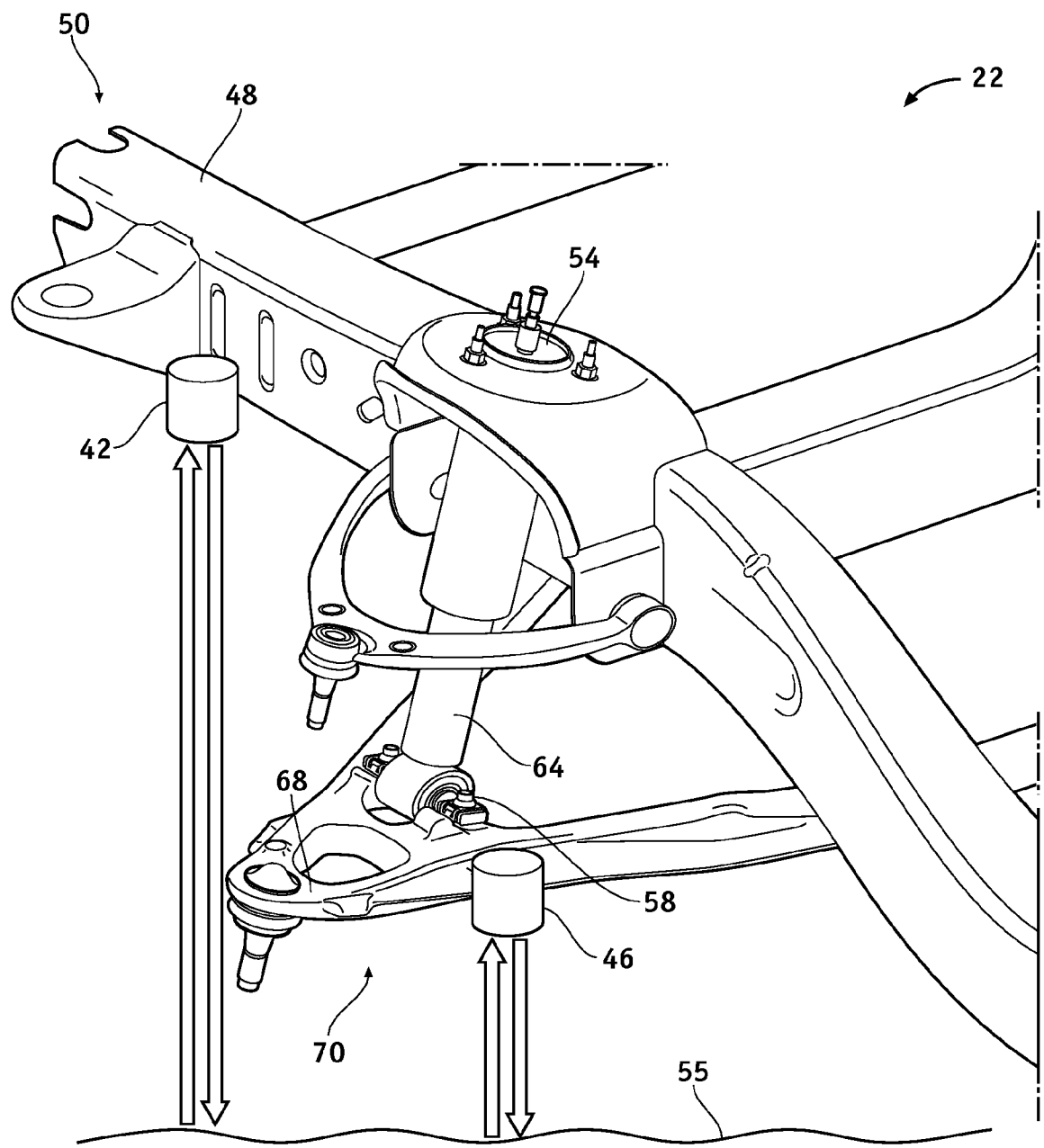
FIG. 4 is an isometric view of a vehicular suspension assembly for use with the vehicle depicted in FIG. 1 and having a height sensing system in accordance with another exemplary embodiment.

FIG. 4 illustrates a second transceiver 46 that may be used in conjunction with first transceiver 42 integrated into suspension assembly 22 in accordance with another exemplary embodiment. Second transceiver 46 is also an element of CCM 33 coupled in two-way communication with processor 37 (FIG. 1), and is one of the types of transceivers previously described for first transceiver 42. Second transceiver 46 may be mechanically coupled to any suitable element of suspension assembly 22 wherein it is desirable to monitor distance to the ground, and preferably to an element different than that of first transceiver 42. For example, as shown in FIG. 4, second transceiver 46 is mounted to lower control arm 68 of the unsprung vehicle mass 70. During operation, first and second transceivers 42 and 46 each emit separate interrogation signals of a type described above toward the ground 55 when prompted by processor 37. Each transceiver then detects the reflection of the interrogation signals emitted by the source transceiver reflected from the ground 55.

First and second transceivers 42 and 46 may be used individually to monitor the absolute suspension component height at the respective location of each in a manner previously described, or may be used in combination to determine the relative height between suspension locations. For example, referring to FIG. 4, when mounted to sprung and unsprung masses 50 and 70, the relative height between masses may be determined as equal to the difference in absolute heights between first and second transceivers 42 and 46. To determine a relative height, processor 37 prompts first and second transceivers 42 and 46 to substantially simultaneously emit interrogation signals to the ground. Each transceiver responds by substantially simultaneously emitting an interrogation signal directed to the ground and detecting the reflection of the respective interrogation signal reflected therefrom. Processor 37 then records the time of prompting and receives from each transceiver a timing signal indicative of the time of detection for that transceiver. Processor 37 uses the prompt time combined with these timing signals to determine an actual elapsed time for each transceiver. Processor 37 then determines the absolute distance to the ground $D_s$ (from sprung mass 50) and $D_u$ (from unsprung mass 70), for transceivers 42 and 46, respectively, using for example, an algorithm that may include Equations (2) and (3) below:

$$D_s = 0.5c \times [\Delta t_s] \quad (2)$$

$$D_u = 0.5c \times [\Delta t_u] \quad (3)$$

where c is the speed of propagation of the transmitted interrogation signal, and $\Delta t_s$ and $\Delta t_u$ represent the elapsed time between emission and detection of interrogation signals originating from first and second transceivers 42 and 46, respectively. The relative height between sprung and unsprung vehicle masses, $H_{su}$, may then be determined using an algorithm that may include Equation (4) below:

$$H_{su} = D_s - D_u \quad (4)$$

The final result may be modified for reasons previously described.

Figure 5:
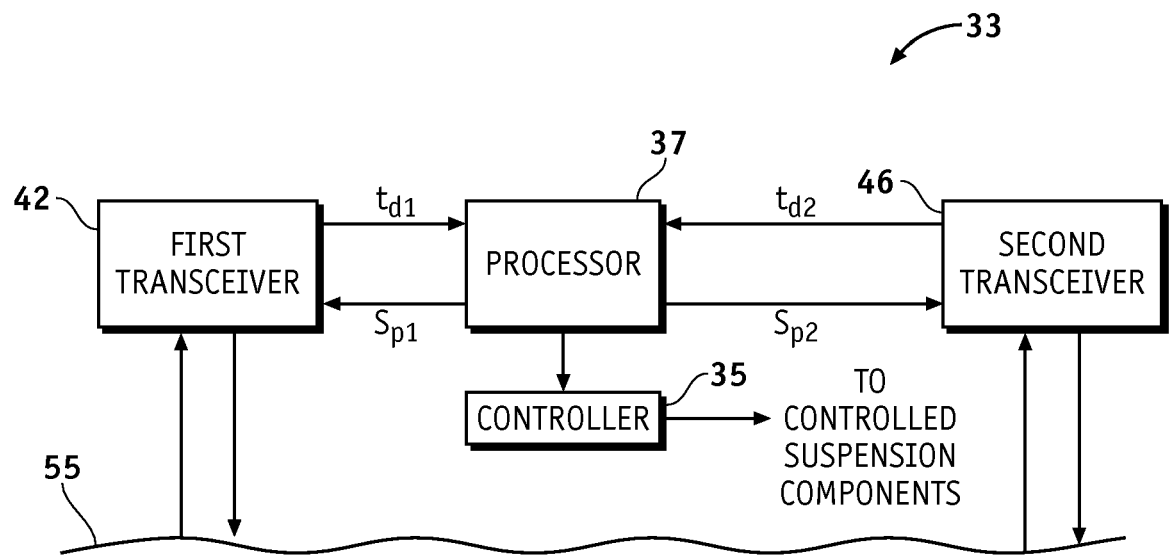
FIG. 5 is a block diagram of the exemplary height sensor system illustrated in FIG. 4.

FIG. 5 is a block diagram illustrating a manner in which selected elements of CCM 33 of vehicle 10 (FIG. 1) including first transceiver 42, second transceiver 46, processor 37, and controller 35 interact in accordance with an exemplary embodiment. Processor 37 is operatively coupled to controller 35, and coupled in two-way communication with both first and second transceivers 42 and 46. Each transceiver is configured to emit electromagnetic or ultrasonic interrogation signals toward the ground 55 when prompted by processor 37, and to detect the reflection of the source interrogation signals returned from the ground 55. When first and second transceivers 42 and 46 are to be used in conjunction to determine a relative height therebetween, processor 60 prompts these transceivers to emit interrogation signals substantially simultaneously. Each transceiver then relays a timing signal indicative of the time of detection ($t_d$) to processor 37. For example, processor 37 sends a first prompting signal, $S_{p1}$, to first transceiver 42 prompting it to emit an interrogation signal to the ground. First transceiver 42 emits a first interrogation signal and detects a reflection of the first interrogation signal from the ground and relays an electronic timing signal, $t_{d1}$, to processor 37 indicative of the time of detection. Similarly, processor 37 sends a second prompting signal, $S_{p2}$, to second transceiver 46 prompting it to emit a second interrogation signal toward the ground. Second transceiver 46 emits the second interrogation signal, detects its reflection, and relays another electronic timing signal, $t_{d2}$, to processor 37. Processor 37 records the time of prompting and combines this time with these timing signals to determine the actual elapsed time between emission and detection for each transceiver. Processor 37 uses the elapsed times in conjunction with an appropriate algorithm previously described to determine the distance of each transceiver from the ground. Processor 37 may also determine the relative height, $H_r$, between transceivers by taking the difference in absolute heights $D_1$ (for first transceiver 42) and $D_2$ (for second transceiver 46) using an algorithm that may include equation (5) below:

$$H_r = D_1 - D_2 \quad (5)$$

Controller 35 receives the resulting height data as an input signal from processor 37, and may dispatch real-time commands to controlled suspension elements in response.

Figure 6:
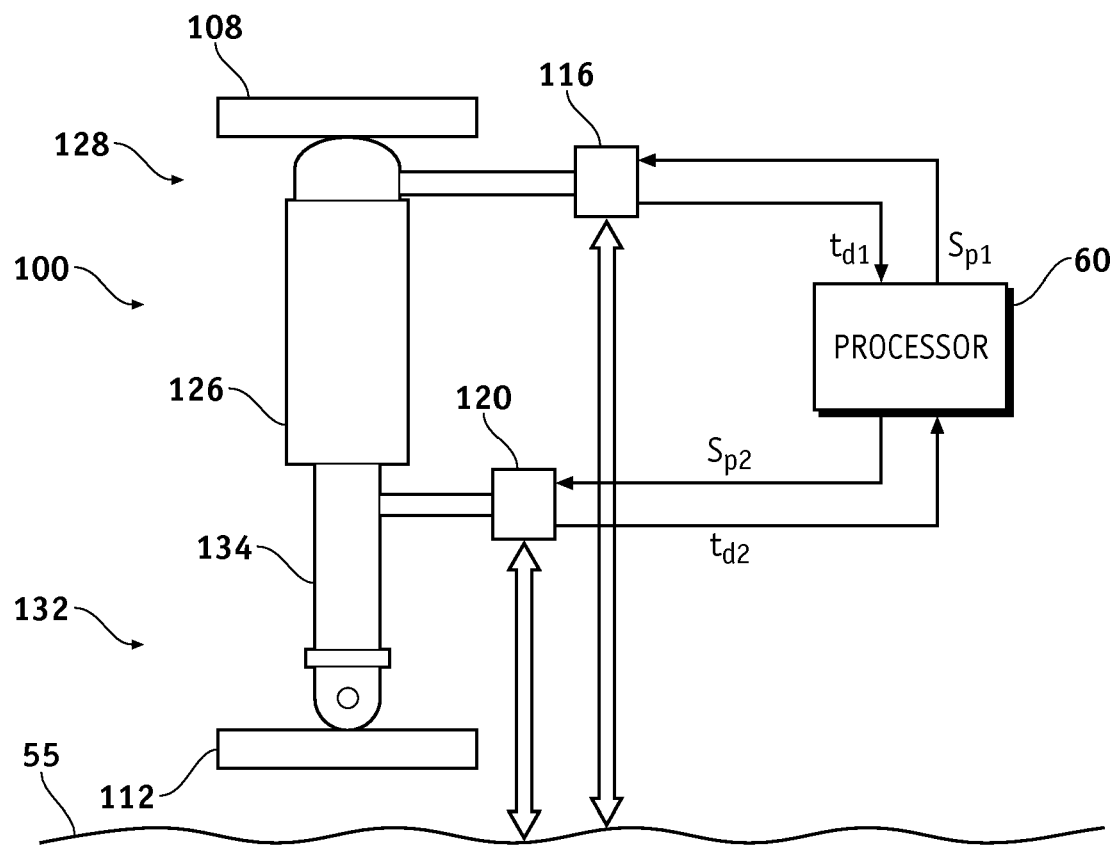
FIG. 6 is a schematic view of an exemplary suspension actuator for use with the vehicle depicted in FIG. 1 and having a height sensing system in accordance with another exemplary embodiment.

FIG. 6 illustrates a suspension actuator 100 having first and second transceivers 116 and 120, respectively, for determining the vertical distance of travel of actuator 100 in accordance with another exemplary embodiment. Suspension actuator 100 may be, for example, a passive actuator assembly such as a non-controllable shock absorber or strut, or a controllable actuator assembly such as a linear actuator, or a controllable shock absorber or strut. Suspension actuator 100 has a first portion 128 that may comprise a dust tube 126 coupled to first transceiver 116 and to a first suspension member 108 that may be a part of the sprung mass. Actuator 100 also has a second portion 132 that may comprise a damper tube 134 coupled to second transceiver 120 and to a second suspension member 112 that may be a part of the unsprung mass. Second portion 132 is fixed relative to first portion 128 which is movable in and out of second portion 132 in a well known manner. Those of skill in the art will appreciate that while actuator 100 is depicted as having damper and dust tubes, many other possible configurations are possible, and therefore this description is made as an example and without limitation. Further, actuator 100 may be coupled between any suitable suspension members without limitation as to whether such members are part of the sprung or unsprung masses.

The distance of travel of actuator 100 is defined as the amount of linear travel of first portion 128 with respect to a reference/zero position such as where first portion 128 is fully retracted within second portion 132. The vertical component of the distance of travel is thus the difference in relative height for first and second transceivers 116 and 120 determined at the position of interest and the reference position.

First and second transceivers 116 and 120 may be any of the transceiver types previously described, and are each coupled in two-way communication with processor 60. During operation, processor 60 sends substantially simultaneous prompting signals, $S_{p1}$ and $S_{p2}$, to first and second transceivers 116 and 120, respectively, to emit interrogation signals directed toward the ground 55, and records the timing of prompting. Each transceiver emits interrogation signals substantially simultaneously and receives a reflection of the interrogation signals emitted by that transceiver from the ground 55. First and second transceivers 116 and 120 each send timing signals $t_{d1}$ and $t_{d2}$ indicative of the timing of detection of each respective transceiver to processor 60. Processor 60 is configured with algorithms described above for determining the relative height or the vertical component of distance between first and second transceivers 116 and 120. The vertical component of the distance of travel, $D_{t1}$, at a time $t_1$ may be determined using algorithms that may include equation (6) below:

$$D_{t1} = H_{t1} - H_R \tag{6}$$

wherein $H_R$ is the relative height determined at the reference position, $H_{t1}$ is the relative height determined at time $t_1$. The final result may be modified to calibrate the system for such factors that include but are not limited to timing signal delay and/or actuator orientation.

Processor 37 may also be configured to determine additional information relating to the vertical component of the absolute velocity and acceleration of a single suspension component. For example, the absolute heights of a single suspension component, $D_1$ and $D_2$, determined at two different times, $t_1$ and $t_2$, may be used to determine the average vertical component of velocity $V_a$ of that component using an algorithm that may include equation (7) below:

$$V_a = \frac{[D_2 - D_1]}{[t_2 - t_1]} \tag{7}$$

Further, the instantaneous velocity, $V_{i1}$, of a single component at time $t_1$ may also be determined using an algorithm that may include equation (8) below:

$$V_{i1} = \lim_{t_2 \to t_1} \frac{[D_2 - D_1]}{[t_2 - t_1]} \tag{8}$$

Further, the instantaneous velocities, $V_{i1}$ and $V_{i2}$, determined at two different times, $t_1$ and $t_2$, may be used to determine the average vertical component of acceleration, $A_a$, of that component between $t_1$ and $t_2$ using an algorithm that may include equation (9) below:

$$A_a = \frac{[V_{i2} - V_{i1}]}{[t_2 - t_1]} \tag{9}$$

The instantaneous acceleration, $A_{i1}$, of a single component at time $t_1$ then may be determined using an algorithm that may include equation (10) below:

$$A_{i1} = \lim_{t_2 \to t_1} \left[ \frac{V_{i2} - V_{i1}}{t_2 - t_1} \right] \tag{10}$$

Processor 37 may also be configured to determine the instantaneous relative velocity and acceleration between suspension components C1 and C2 based upon height data. For example the instantaneous relative velocity, $V_{ir}$, may be determined for a time $t_1$ by taking the difference in the instantaneous velocities, $V_{iC1}$ and $V_{iC2}$, of each component at time $t_1$ using an algorithm that may include equations (11) below:

$$V_{ir} = V_{iC2} - V_{iC1} \tag{11}$$

The instantaneous relative acceleration, $A_{ri}$, between suspension components C1 and C2 may be determined by taking the difference in the instantaneous accelerations, $A_{iC1}$ and $A_{iC2}$, of each component using an algorithm that may include equation (12) below:

$$A_{ri} = A_{iC2} - A_{iC1} \tag{12}$$

The embodiments described herein provide a height sensing system for a vehicular suspension. Processor-controlled transceivers coupled to suspension component(s) to be monitored emit pulsed electromagnetic or ultrasonic interrogation signals and receive these interrogation signals reflected from the ground. A processor coupled to these transceivers converts the timing of emission and detection to a time differential and determines therefrom a corresponding absolute height. This system may also be used to determine the relative height between two suspension components or the vertical distance of travel of an actuator at a point in time by determining the difference in absolute heights between monitored points on each of these elements. Height data gathered over a time interval may be used to determine vertical components of both velocity and acceleration for an individual suspension component, or may be combined with similar data from a second suspension component to determine relative velocity and acceleration therebetween. Data relating to the absolute and relative, height, velocity, acceleration, and/or the vertical distance of travel of a suspension component may be relayed to a controller to provide a basis for on-the-fly chassis adjustments to enhance driving stability and handling performance.

The preceding description refers to elements or nodes or features being "connected" or "coupled" together. As used herein, unless expressly stated otherwise, "connected" means that one element/node/feature is directly joined to (or directly communicates with) another element, node or other feature in a mechanical, logical, electrical or other appropriate sense. Likewise, unless expressly stated otherwise, "coupled" means that one element/node/feature is directly or indirectly joined to (or directly or indirectly communicates with) another element/node/feature in a mechanical, logical, electrical or other appropriate sense. The term "exemplary" is used in the sense of "example," rather than "model." Further, although the figures may depict example arrangements of elements, additional intervening elements, devices, features, or components may be present in a practical embodiment of the invention.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention and the legal equivalents thereof.

What is claimed is:

1. A system for determining a distance between a vehicular suspension assembly and the ground, the suspension assembly having a first member coupled to a sprung mass and a second member coupled to an unsprung mass, the system comprising:
   a first transceiver coupled to the first member for emitting a first interrogation signal toward the ground, receiving a first reflection of the first interrogation signal from the ground, and transmitting a first timing signal when the first reflection is received;
   a second transceiver coupled to the second member for emitting a second interrogation signal toward the ground, receiving a second reflection of the second interrogation signal from the ground, and transmitting a second timing signal when the second reflection is received; and
   a processor coupled to the first transceiver and the second transceiver and configured to determine the distance of the first transceiver and the second transceiver from the ground;
   wherein the processor prompts the first transceiver to emit the first interrogation signal and prompts the second transceiver to emit the second interrogation signal substantially simultaneously.

2. A system according to claim 1, wherein the first transceiver is configured to emit UWB interrogation signals.

3. A system according to claim 1, wherein the first transceiver is configured to receive UWB interrogation signals reflected from the ground.

4. A system according to claim 1, wherein the suspension assembly further comprises a damper assembly having a first portion coupled to the sprung mass and a second portion coupled to the unsprung mass, and wherein the first transceiver is coupled to the first portion, and the second transceiver is coupled to the second portion.

5. A system according to claim 4, wherein the first portion comprises a dust tube, and the second portion comprises a damper tube, and wherein the first transceiver is coupled to the dust tube, and the second transceiver is coupled to the damper tube.

6. A system according to claim 1, wherein the processor is further configured to determine the vertical component of the velocity of the first transceiver.

7. A system according to claim 1, wherein the suspension assembly further comprises a suspension actuator assembly having a movable portion coupled to the first member and a stationary portion coupled to the second member, and wherein the first transceiver is coupled to the movable portion and the second transceiver is coupled to the stationary portion.

8. A system for determining a distance between a sprung mass of a vehicular suspension assembly and an unsprung mass of the suspension assembly, the system comprising:
   a first transceiver coupled to one of the sprung mass or the unsprung mass for emitting a first interrogation signal toward the ground and for receiving a first reflection of the first interrogation signal reflected from the ground;
   a second transceiver coupled to the other of the sprung mass or the unsprung mass for emitting a second interrogation signal toward the ground and for receiving a second reflection of the second interrogation signal reflected from the ground; and
   a processor coupled to the first and second transceivers configured to determine the distance between the sprung mass and the unsprung mass;
   wherein the processor is further configured to determine the instantaneous velocity of the first transceiver.

9. A system according to claim 8, wherein the first transceiver sends a first timing signal to the processor when the first reflection is received, and the second transceiver sends a second timing signal to the processor when the second reflection is received.

10. A system according to claim 8, wherein the processor prompts the first transceiver to emit the first interrogation signal, and the second transceiver to emit the second interrogation signal substantially simultaneously.

11. A system according to claim 8, wherein the processor is further configured to determine the instantaneous acceleration of the first transceiver.

12. A system for determining a vertical distance of travel of an actuator assembly for a vehicle having a suspension assembly, the suspension assembly having a first member coupled to a spring mass and a second member coupled to an unspring mass, the actuator assembly having a first end coupled to the first member and a second end coupled to the second member, the system comprising:
   a first transceiver coupled to the first end for emitting a first interrogation signal toward the ground, and for receiving a first reflection of the first interrogation signal reflected from the ground;
   a second transceiver coupled to the second end for emitting a second interrogation signal toward the ground, and for receiving a second reflection of the second interrogation signal reflected from the ground; and
   a processor coupled to the first and second transceivers and configured to: substantially simultaneously prompt the first and second transceivers to emit the first and second interrogation signals, respectively, and determine the vertical distance of travel of the actuator assembly.

13. A system according to claim 12, wherein the actuator assembly comprises a passive actuator.

14. A system according to claim 12, wherein the actuator assembly comprises a controllable actuator.

* * * * *